United States Patent
Vos et al.

(10) Patent No.: US 11,111,913 B2
(45) Date of Patent: Sep. 7, 2021

(54) OIL LUBRICATED COMPRESSOR

(71) Applicant: Black & Decker Inc., New Britain, CT (US)

(72) Inventors: Stephen J. Vos, Jackson, TN (US); Lance S. Hathcock, Jackson, TN (US); James Vintzel, Jackson, TN (US); Dalton E. McFarland, Medina, TN (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/287,731

(22) Filed: Oct. 6, 2016

(65) Prior Publication Data
US 2017/0101985 A1    Apr. 13, 2017

Related U.S. Application Data

(60) Provisional application No. 62/238,306, filed on Oct. 7, 2015.

(51) Int. Cl.
*F04B 49/02* (2006.01)
*F04B 39/02* (2006.01)
(Continued)

(52) U.S. Cl.
CPC .............. *F04B 49/02* (2013.01); *F04B 35/04* (2013.01); *F04B 35/06* (2013.01);
(Continued)

(58) Field of Classification Search
CPC ...... F04B 39/06; F04B 39/066; F04B 39/121; F04B 35/04; F04B 35/06; F04B 41/02;
(Continued)

(56) References Cited

U.S. PATENT DOCUMENTS

| 1,381,056 A | 6/1921 | Blakely |
| 1,469,201 A | 9/1923 | Whitted et al. |

(Continued)

FOREIGN PATENT DOCUMENTS

| DE | 2751298 A1 | 5/1979 |
| DE | 10117791 A1 | 10/2002 |

(Continued)

OTHER PUBLICATIONS

Extended European Search Report, EP Application No. 12 184 258.7, EPO (dated Feb. 16, 2017).
(Continued)

*Primary Examiner* — Peter J Bertheaud
(74) *Attorney, Agent, or Firm* — Wright IP & International Law; Eric G. Wright

(57) ABSTRACT

An oil lubricated compressor having a universal motor, efficient starting and re-starting characteristics, and a long operating life. The oil lubricated compressor can have a brushed or brushless universal motor which can drive a cooling fan and a pump. The universal motor can achieve a high torque to voltage ratio, as well as a high torque to current ratio, upon starting or re-starting of the compressor. Optionally, the oil lubricated compressor can use a single cooling fan disposed in the compressor at a location which is between the universal motor and a cylinder head of the pump.

19 Claims, 5 Drawing Sheets

FIG.1B

(51) Int. Cl.
| | |
|---|---|
| *F04B 35/04* | (2006.01) |
| *F04B 39/06* | (2006.01) |
| *H02K 9/06* | (2006.01) |
| *H02K 13/10* | (2006.01) |
| *F04B 35/06* | (2006.01) |
| *F04B 41/02* | (2006.01) |
| *H02K 7/10* | (2006.01) |

(52) U.S. Cl.
CPC .......... *F04B 39/0276* (2013.01); *F04B 39/06* (2013.01); *F04B 39/066* (2013.01); *F04B 41/02* (2013.01); *H02K 7/1004* (2013.01); *H02K 9/06* (2013.01); *H02K 13/10* (2013.01); *F04B 2203/0201* (2013.01); *F04B 2203/0202* (2013.01); *H02K 2213/03* (2013.01)

(58) Field of Classification Search
CPC ....... F04B 39/0276; F04B 49/02; H02K 9/06; H02K 13/10
See application file for complete search history.

(56) References Cited

U.S. PATENT DOCUMENTS

| | | | |
|---|---|---|---|
| 1,694,218 A | 6/1924 | Hazard | |
| 1,924,654 A | 3/1930 | Petersen | |
| 2,059,894 A * | 11/1936 | Newman | F25B 31/023 |
| | | | 417/281 |
| 2,136,098 A | 7/1937 | Browne | |
| 2,106,488 A * | 1/1938 | McCune | F04B 27/053 |
| | | | 417/203 |
| 2,107,644 A * | 2/1938 | Ohmart | F25B 31/023 |
| | | | 137/53 |
| 2,312,596 A | 2/1940 | Smith | |
| 2,343,952 A | 2/1943 | Branstrom | |
| 2,375,442 A | 5/1945 | Sandberg | |
| 2,450,468 A * | 10/1948 | Cornelius | F04B 27/04 |
| | | | 417/265 |
| 2,668,004 A * | 2/1954 | Browne | F04B 27/02 |
| | | | 417/265 |
| 2,673,028 A * | 3/1954 | Cornelius | F04B 39/02 |
| | | | 417/262 |
| D181,459 S | 11/1957 | Bullock | |
| 2,928,491 A | 3/1960 | Crouch | |
| 3,370,608 A | 2/1968 | Eisenbrand et al. | |
| 3,525,606 A | 8/1970 | Bodine | |
| 3,537,544 A | 11/1970 | King et al. | |
| 3,645,651 A * | 2/1972 | Bills | F04B 35/04 |
| | | | 417/479 |
| 3,710,094 A | 1/1973 | Monte et al. | |
| 3,736,074 A | 5/1973 | Kilbane et al. | |
| 3,771,911 A * | 11/1973 | Turci | F04B 35/04 |
| | | | 417/413.1 |
| 3,930,558 A | 1/1976 | Schnell et al. | |
| 3,955,900 A | 5/1976 | Vinci | |
| 3,978,919 A | 9/1976 | Fachbach et al. | |
| 3,980,912 A | 9/1976 | Panza | |
| 4,190,402 A | 2/1980 | Meece et al. | |
| 4,264,282 A | 4/1981 | Crago | |
| 4,283,167 A * | 8/1981 | Bassan | F04C 27/02 |
| | | | 418/101 |
| 4,289,630 A | 9/1981 | Schmidt, Jr. et al. | |
| 4,302,224 A | 11/1981 | McCombs et al. | |
| D263,216 S | 3/1982 | Maher | |
| 4,342,573 A | 8/1982 | McCombs et al. | |
| 4,401,418 A | 8/1983 | Fritchman | |
| 4,460,319 A | 7/1984 | Ashikian | |
| 4,492,533 A | 1/1985 | Tsuge | |
| 4,516,657 A | 5/1985 | Allard | |
| 4,553,903 A | 11/1985 | Ashikian | |
| 4,566,800 A | 1/1986 | Bodine | |
| 4,722,673 A | 2/1988 | Grime et al. | |
| 4,907,546 A | 3/1990 | Ishii et al. | |
| 4,928,480 A | 5/1990 | Oliver et al. | |
| 4,950,133 A | 8/1990 | Sargent | |
| 4,988,268 A | 1/1991 | Kurihara | |
| 5,020,973 A | 6/1991 | Lammers | |
| 5,082,019 A | 1/1992 | Tetrault | |
| 5,133,475 A | 7/1992 | Sharp | |
| 5,137,434 A * | 8/1992 | Wheeler | F04B 39/066 |
| | | | 417/368 |
| 5,143,772 A | 9/1992 | Iwasa | |
| 5,145,335 A * | 9/1992 | Abelen | F04B 39/066 |
| | | | 417/410.3 |
| D335,407 S | 5/1993 | Ngian et al. | |
| 5,213,484 A | 5/1993 | Hashimoto et al. | |
| 5,252,035 A | 10/1993 | Lee | |
| 5,311,090 A | 5/1994 | Ferlatte | |
| 5,311,625 A | 5/1994 | Barker et al. | |
| 5,336,046 A | 8/1994 | Hashimoto et al. | |
| 5,407,330 A | 4/1995 | Rimington et al. | |
| 5,417,258 A | 5/1995 | Privas | |
| 5,509,790 A * | 4/1996 | Schuderi | F04B 35/04 |
| | | | 417/201 |
| 5,526,228 A | 6/1996 | Dickson et al. | |
| 5,620,370 A | 4/1997 | Umai et al. | |
| 5,647,314 A | 7/1997 | Matsumura et al. | |
| 5,678,543 A | 10/1997 | Bower | |
| 5,725,361 A | 3/1998 | Dantlgraber | |
| 6,023,938 A | 2/2000 | Taras et al. | |
| 6,091,160 A | 7/2000 | Kouchi et al. | |
| 6,099,268 A | 8/2000 | Pressel | |
| 6,100,599 A | 8/2000 | Kouchi et al. | |
| 6,145,974 A | 11/2000 | Shinada et al. | |
| D437,581 S | 2/2001 | Aruga et al. | |
| D437,825 S | 2/2001 | Imai | |
| 6,206,654 B1 | 3/2001 | Cassidy | |
| D444,796 S | 7/2001 | Morgan | |
| D444,797 S | 7/2001 | Davis et al. | |
| 6,257,842 B1 | 7/2001 | Kawasaki et al. | |
| 6,331,740 B1 | 12/2001 | Morohoshi et al. | |
| D454,357 S | 3/2002 | Diels | |
| 6,357,338 B2 | 3/2002 | Montgomery | |
| 6,362,533 B1 | 3/2002 | Morohoshi et al. | |
| 6,364,632 B1 | 4/2002 | Cromm et al. | |
| 6,378,468 B1 | 4/2002 | Kouchi et al. | |
| 6,378,469 B1 | 4/2002 | Hiranuma et al. | |
| 6,386,833 B1 | 5/2002 | Montgomery | |
| D461,196 S | 8/2002 | Buck | |
| 6,428,283 B1 | 8/2002 | Bonior | |
| 6,428,288 B1 | 8/2002 | King | |
| 6,431,839 B2 | 8/2002 | Gruber et al. | |
| 6,435,076 B2 | 8/2002 | Montgomery | |
| 6,447,257 B2 | 9/2002 | Orschell | |
| 6,454,527 B2 | 9/2002 | Nishiyama et al. | |
| 6,474,954 B1 | 11/2002 | Bell et al. | |
| 6,554,583 B1 | 4/2003 | Pressel | |
| 6,571,561 B1 | 6/2003 | Aquino et al. | |
| 6,616,415 B1 | 9/2003 | Renken et al. | |
| 6,682,317 B2 | 1/2004 | Chen | |
| 6,720,098 B2 | 4/2004 | Raiser | |
| 6,751,941 B2 | 6/2004 | Edelman et al. | |
| 6,784,560 B2 | 8/2004 | Sugimoto et al. | |
| 6,790,012 B2 | 9/2004 | Sharp et al. | |
| 6,814,659 B2 | 11/2004 | Cigelske, Jr. | |
| D499,431 S | 12/2004 | Chen | |
| 6,952,056 B2 | 10/2005 | Brandenburg et al. | |
| 6,962,057 B2 | 11/2005 | Kurokawa et al. | |
| 6,991,436 B2 | 1/2006 | Beckman et al. | |
| 6,998,725 B2 | 2/2006 | Brandenburg et al. | |
| D517,009 S | 3/2006 | Xiao | |
| D521,929 S | 5/2006 | Xiao | |
| D531,193 S | 10/2006 | Caito | |
| 7,147,444 B2 | 12/2006 | Cheon | |
| D536,348 S | 2/2007 | Bass | |
| D536,708 S | 2/2007 | Bass | |
| 7,189,068 B2 | 3/2007 | Thomas, Jr. et al. | |
| D551,141 S | 9/2007 | Canitano | |
| 7,283,359 B2 | 10/2007 | Bartell et al. | |
| 7,306,438 B2 | 12/2007 | Kang et al. | |
| 7,316,291 B2 | 1/2008 | Thomsen et al. | |
| D566,042 S | 4/2008 | Yamasaki et al. | |
| D568,797 S | 5/2008 | Elwell | |

(56) References Cited

U.S. PATENT DOCUMENTS

| | | |
|---|---|---|
| D572,658 S | 7/2008 | Yamamoto et al. |
| 7,392,770 B2 | 7/2008 | Xiao |
| 7,398,747 B2 | 7/2008 | Onodera et al. |
| 7,398,855 B2 | 7/2008 | Seel |
| 7,400,501 B2 | 7/2008 | Bartell et al. |
| D576,723 S | 9/2008 | Achen |
| 7,430,992 B2 | 10/2008 | Murakami et al. |
| 7,452,256 B2 | 11/2008 | Kasai et al. |
| 7,491,264 B2 | 2/2009 | Tao et al. |
| D588,987 S | 3/2009 | Kato |
| D589,985 S | 4/2009 | Steinfels |
| D593,032 S | 5/2009 | Wang et al. |
| 7,541,701 B2 | 6/2009 | Lin et al. |
| 7,563,077 B2 | 7/2009 | Santa Ana |
| D600,205 S | 9/2009 | Imai |
| 7,597,340 B2 | 10/2009 | Hirose et al. |
| 7,614,473 B2 | 11/2009 | Ono et al. |
| 7,643,284 B2 | 1/2010 | Nakamura |
| 7,678,165 B2 | 3/2010 | Tingle et al. |
| 7,707,711 B2 | 5/2010 | Bartell et al. |
| 7,743,739 B2 | 6/2010 | Kochi et al. |
| 7,762,790 B2 * | 7/2010 | Steinfels ................ F04B 35/06 137/565.18 |
| 7,779,792 B2 | 8/2010 | Kubo et al. |
| 7,779,793 B2 | 8/2010 | Ito et al. |
| 7,811,653 B2 | 10/2010 | Miyakawa et al. |
| 7,854,517 B2 | 12/2010 | Tsubura |
| 8,215,448 B2 | 7/2012 | Harting et al. |
| 8,230,968 B2 | 7/2012 | Jung et al. |
| 8,246,320 B2 | 8/2012 | Park et al. |
| 8,316,987 B2 | 11/2012 | Ishida et al. |
| 8,327,975 B2 | 12/2012 | Ortman et al. |
| 8,584,795 B1 | 11/2013 | Buckner |
| 8,770,341 B2 | 7/2014 | Wood et al. |
| 8,899,378 B2 | 12/2014 | Wood et al. |
| 8,967,324 B2 | 3/2015 | White et al. |
| 8,992,186 B2 | 3/2015 | Silveira et al. |
| 9,309,876 B2 | 4/2016 | Wood et al. |
| 9,476,416 B2 | 10/2016 | Chen |
| 2002/0009372 A1 | 1/2002 | Gruber et al. |
| 2002/0134617 A1 | 9/2002 | Nissen et al. |
| 2002/0185333 A1 | 12/2002 | Svendsen |
| 2004/0103683 A1 | 6/2004 | Yoon |
| 2005/0092544 A1 | 5/2005 | Lee |
| 2005/0220640 A1 | 10/2005 | Finkenbinder et al. |
| 2005/0247750 A1 | 11/2005 | Burkolder et al. |
| 2006/0104830 A1 | 5/2006 | Fields |
| 2006/0104833 A1 | 5/2006 | Hueppchen |
| 2006/0104834 A1 | 5/2006 | Stilwell |
| 2006/0104837 A1 | 5/2006 | Lee et al. |
| 2006/0137522 A1 | 6/2006 | Nishimura et al. |
| 2008/0008603 A1 | 1/2008 | Schoegler |
| 2008/0045368 A1 | 2/2008 | Nishihara |
| 2008/0053746 A1 | 3/2008 | Albert et al. |
| 2008/0069703 A1 | 3/2008 | Beckman |
| 2008/0152518 A1 | 6/2008 | Stilwell |
| 2008/0181794 A1 | 7/2008 | Steinfels et al. |
| 2008/0187447 A1 | 8/2008 | Steinfels et al. |
| 2009/0016902 A1 | 1/2009 | Lee et al. |
| 2009/0050219 A1 | 2/2009 | Firoenza et al. |
| 2009/0114476 A1 | 5/2009 | Lewis et al. |
| 2010/0112929 A1 | 5/2010 | Iantorno |
| 2010/0192878 A1 | 8/2010 | Mustafa |
| 2010/0225012 A1 | 9/2010 | Fitton et al. |
| 2010/0226750 A1 | 9/2010 | Gammack |
| 2010/0226771 A1 | 9/2010 | Crawford et al. |
| 2010/0226787 A1 | 9/2010 | Gammack et al. |
| 2010/0239438 A1 | 9/2010 | Kinjo et al. |
| 2010/0290929 A1 | 11/2010 | Ohi et al. |
| 2010/0317281 A1 | 12/2010 | Sperandio et al. |
| 2011/0094052 A1 | 4/2011 | Witter |
| 2011/0095540 A1 | 4/2011 | Jackson et al. |
| 2011/0158828 A1 | 6/2011 | Nutz et al. |
| 2011/0182754 A1 | 7/2011 | Gathers et al. |
| 2015/0345490 A1 * | 12/2015 | Bremeier ................ F04B 49/06 417/22 |

FOREIGN PATENT DOCUMENTS

| | | |
|---|---|---|
| EP | 2320085 A2 | 5/2011 |
| EP | 2706234 A1 | 12/2014 |
| FR | 919265 | 3/1947 |
| GB | 2153920 A | 8/1985 |
| JP | 54041562 A | 4/1979 |
| JP | 1080793 A | 3/1989 |
| JP | 4232390 A | 8/1992 |
| JP | 5133330 A | 5/1993 |
| JP | 7109977 A | 4/1995 |
| JP | 9250456 A | 9/1997 |
| JP | 9250457 A | 9/1997 |
| JP | 10148135 A | 6/1998 |
| JP | 10339268 A | 12/1998 |
| JP | 2003065241 A | 3/2003 |
| JP | 2006292243 A | 10/2006 |
| WO | 2006062223 A1 | 6/2006 |
| WO | 2006090345 A2 | 8/2006 |
| WO | 2008021251 A2 | 2/2008 |
| WO | 2009152594 A1 | 12/2009 |
| WO | 2010092790 A1 | 8/2010 |

OTHER PUBLICATIONS

Extended European Search Report, EP Application No. 15 201 260.5, EPO (dated May 6, 2016).

Extended European Search Report, EP Application No. 13 184 002.7, EPO (dated Nov. 29, 2013).

Extended European Search Report, EP Application No. 13 183 932.6, EPO (dated Nov. 29, 2013).

Thomas Pumps & Compressors, WOB-L Piston, Technical Document, pp. 1-2 (2002).

LaBelle et al., Design and Development of an Old Concept Using New Materials to Produce an Air Compressor, Thomas Industries Power Air Division, pp. 68-72 (1978), International Computer Engineering Conference, Paper 248, http://docs.lib.purdue.edu/iced/248.

Communication Pursuant to Article 94(3) EPC, Application No. 12 184 258.7-1004, EPO (dated Jun. 19, 2020).

Communication Pursuant to Article 94(3) EPC, Application No. 12 184 220.7-1004, EPO (dated Jun. 19, 2020).

Communication Pursuant to Article 94(3) EPC, Application No. 12 184 220.7-1004, EPO (dated Jan. 24, 2019).

Extended European Search Report, Application No. 12 184 220.7-1616 / 2570669, EPO (dated Feb. 14, 2017).

* cited by examiner

OIL LUBRICATED COMPRESSOR

CROSS-REFERENCE TO RELATED APPLICATIONS

This patent application claims benefit of the filing date of U.S. provisional patent application No. 62/238,306 entitled "Universal Motor-Driven Oil Lube Compressor" filed on Oct. 7, 2015.

FIELD OF THE INVENTION

The present invention relates to the field of compressors and, in particular, to an oil lubricated compressor for compressing air.

INCORPORATION BY REFERENCE

This patent application incorporates by reference in its entirety U.S. provisional patent application No. 62/238,306 entitled "Universal Motor-Driven Oil Lube Compressor" filed on Oct. 7, 2015. This patent application also incorporates by reference in its entirety U.S. Pat. No. 7,081,698 entitled "Efficient Motor" issue on Jul. 25, 2006.

BACKGROUND OF THE INVENTION

A compressor can be used to provide compressed air to a pneumatically powered tool. A compressor can have a prime mover for driving the compressor, and a tank for storing the compressed air. The prime mover can include an electric motor or an internal combustion engine. Typical motor-driven oil-lubricated compressor pumps use induction motors as the prime mover. Induction motor torque is generated from an induced field in the armature of the motor. The induced field is generated over an air gap located between the field and the armature. However, typical induction motor-driven oil lubricated compressor pumps have a low torque value and thereby struggle or fail to overcome the viscosity of the lubricating oil, thereby resulting in difficulty starting and re-starting the induction motor. Additionally, a high current, such as, for example, 100 amps or greater is required to deliver the torque necessary to successfully start the motor of an induction motor-driven oil lubricated compressor. Because of the high current required by the induction motor, use of extension cords with such induction motors are known to trip the breakers on the compressor, or in the electrical panel providing power to the compressor. As such, there is an industry need for an improved oil lubricated compressor free of these failures.

SUMMARY OF THE INVENTION

In an embodiment, an oil lubricated compressor, can have a universal motor to drive a pump and a fan. The compressor can have a low start voltage, a low re-start voltage, high torque to voltage characteristics, and a long operating life. The operating life of the compressor and/or the universal motor can be in a range of 300 hrs to 600 hrs, or greater. The universal motor can be a brushed universal motor, optionally having an electrographite grade brush. The universal motor can also be a brushless universal motor.

In an embodiment, an inrush current of the universal motor can be 85 amps or less. The inrush time of the universal motor can be less than 300 ms and the inrush current of the universal motor can be 90 amps or less. In another embodiment, the inrush current can be 95 amps or less for an inrush time of 300 ms or less, or can be 75V or less for an inrush time of 300 ms or less. The oil lubricated compressor can start and/or re-start at a voltage of 90% or less of rated voltage, or 50% to 90% of rated voltage. In an embodiment, the oil lubricated compressor can start and/or re-start at a voltage in a range of 75V to 90V. In an embodiment, the oil lubricated compressor can start and/or re-start at a voltage of 90V or less at an ambient temperature of 20° C.

In an embodiment, an improved universal motor is used to power a pump. The universal motor can be a brushed motor that can run on alternating and/or direct current applied voltages. The universal motor has a torque generated from a field in the armature of the motor that is created through direct contact with the armature and/or the commutator through a brush system. The direct contact of the brush system to the armature and/or the commutator has fewer losses of induced field and helps to generate equivalent, or higher, starting torque values at a lower amperage than an induction motor. An interface and/or air gap can exist between the stator and the rotor of the universal motor, whether the motor is a brushed motor or a brushless motor. The universal motor has an improved commutator design that includes brushes having an electrographite grade, at least a doubled axial length as compared to typical universal motors and increased tangential dimension as compared to typical universal motors, resulting in a longer brush life over typical universal motors that use brushes having lower resin bonded grades and higher voltage drop characteristics at start and/or re-start. The universal motor disclosed herein can provide a higher torque at a lower amperage value than typical universal motors that use brushes having lower resin bonded grades and having higher voltage drop characteristics. The universal motor disclosed herein can overcome the viscosity of the oil lubricating the pump and can readily start in cold weather, as well as under low voltage, or under adverse conditions.

In addition, the armature in the universal motor is larger in length and diameter than typical universal motors, which helps to generate additional torque. The universal motor of the present invention has a high torque value that uses a low starting current to prevent breakers from tripping during starting or re-starting of the pump in cold weather, as well as low voltage, or adverse conditions.

The oil lubricated compressor can have a universal motor which can drive a pump assembly having a cylinder head, and can drive a fan which can provide a forced flow of a cooling air stream to cool both the universal motor and the cylinder head. In an embodiment, the universal motor can use a sprocket to drive a drive belt which can drive a flywheel that causes a pump assembly to pump thereby compressing air to produce compressed air. A pneumatic power hose extending from the tank can provide compressed air to a pneumatically powered tool.

In an embodiment, the compressor can have the universal motor disposed at a location between the fan and the cylinder head. The fan can cause a cooling air stream to flow across at least a portion of the cylinder head and then across at least a portion of the universal motor. Alternately, the fan can cause a flow of the cooling air stream to flow in an opposite direction across at least a portion of the universal motor and then across at least a portion of the cylinder head.

In a different embodiment, the fan can be disposed at a location between the universal motor and the cylinder head. The fan can cause a flow of the cooling air stream across at least a portion of the cylinder head and then across at least a portion of the universal motor. Alternately, the fan can cause a flow of the cooling air stream to flow across at least a portion of the universal motor and then across at least a portion of the cylinder head.

In an embodiment, the method for starting an oil lubricated compressor, can have the steps of: providing the universal motor having an electrographite grade brush; configuring the universal motor to drive the pump; configuring the universal motor to drive a pump that is at least in part lubricated by an oil; applying an inrush current of 90 amps or less to the universal motor for an inrush time of 300 ms or less; achieving a rotation of a rotor of the universal motor;

and compressing air to produce a compressed air.

BRIEF DESCRIPTION OF THE DRAWINGS

The present invention in its several aspects and embodiments solves the problems discussed above and significantly advances the technology of compressors. The present invention can become more fully understood from the detailed description and the accompanying drawings, wherein.

Herein, like reference numbers in one figure refer to like reference numbers in another figure.

DETAILED DESCRIPTION OF THE INVENTION

Figure 1A:
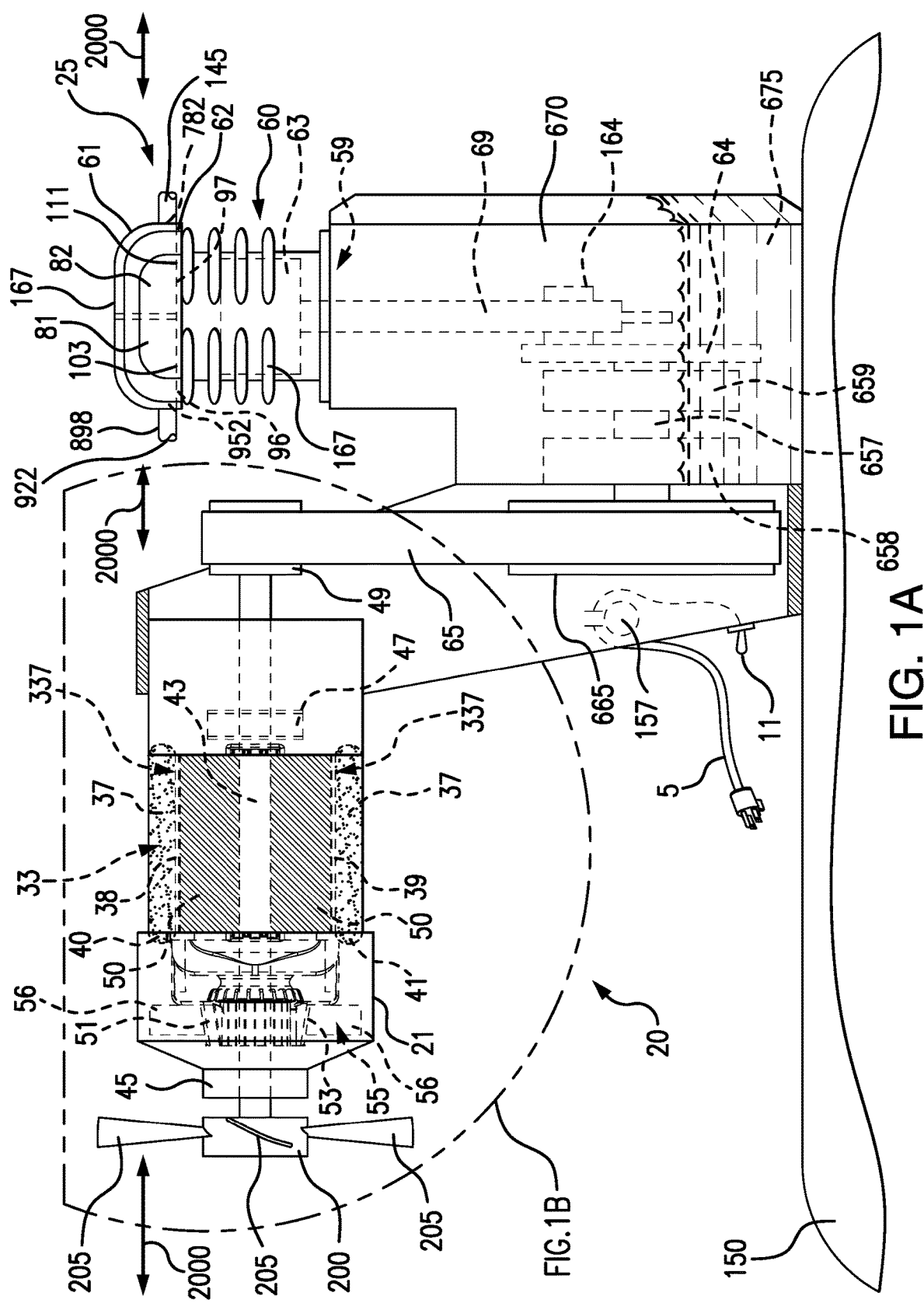
FIG. 1A shows a first embodiment of a universal motor-driven oil lubricated compressor.

FIG. 1A shows a first embodiment of an oil lubricated compressor assembly 20 (herein as "compressor assembly" 20) for producing compressed air. The compressor assembly 20 can have a universal motor 33, a fan 200 and a pump assembly 25 which compresses an air feed. The universal motor 33 can drive a fan 200 and a pump member 59 of the pump assembly 25. The pump assembly 25 feeds the compressed air to an air or gas containing structure, such as a compressed air tank 150. The compressed air can be retained in the compressed air tank 150 and can be released according to user demand through a pneumatic air hose, or other means, and can power a variety of tools. The compressor assembly 20 can have a low start voltage, a low re-start voltage, high torque to voltage characteristics and a long operating life, such as 300 hrs to 600 hrs, or greater.

The Universal Motor

Figure 1B:
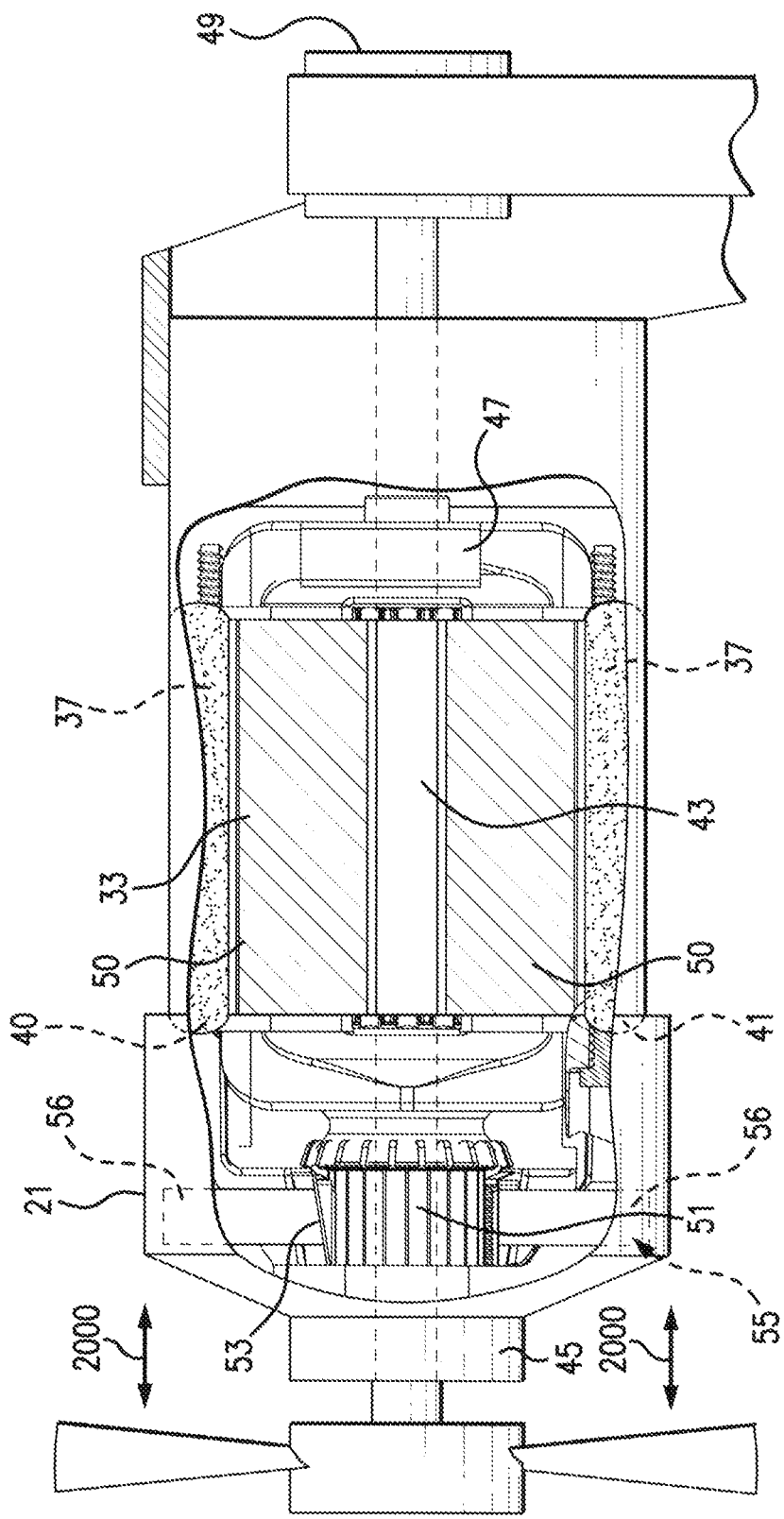
FIG. 1B shows a cross-sectional detail of the universal motor which drives the oil lubricated compressor shown in FIG. 1A.

The universal motor 33 can have a stator 37 with an upper pole 38 around which upper stator coil 40 is wound and/or configured. FIG. 1B shows a cross-sectional detail of the universal motor 33 of FIG. 1A of the compressor assembly 20 shown in FIG. 1A. The motor can have a stator 37 with a lower pole 39 around which lower stator coil 41 is wound and/or configured. A motor shaft 43 can be supported by one or more bearings, such as a bearing 45 and a bearing 47. The fan 200 is secured to the motor shaft 43 and has a plurality of blades 205. When power is applied to the universal motor 33, the motor shaft 43 can rotate at a high speed driving a sprocket 49, a drive belt 65, a flywheel 665 and the fan 200, as described herein.

As shown, the universal motor 33 can be connected to an outer portion of an oil pump crankcase 670. The universal motor 33 can be an alternating current motor that can receive electrical power through a power cord 5, i.e. AC current. Alternatively, the universal motor 33 can be powered by direct current, i.e. DC current.

Numeric values and ranges herein, unless otherwise stated, also are intended to have associated with them a tolerance and to account for variances of design and manufacturing, and/or operational and performance fluctuations. Thus, a number disclosed herein is intended to disclose values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance, as well as operational or performance fluctuations, are an expected aspect of mechanical design and the numbers disclosed herein are intended to be construed to allow for such factors, in non-limiting example such as ±10 percent of a given value. This disclosure is to be broadly construed. Likewise, the claims are to be broadly construed in their recitations of numbers and ranges.

In an embodiment, the universal motor 33 is used to power the compressor 25 and/or drive the pump member 59. In an embodiment, a universal motor 33 can be a brushed motor, or a brushless motor, that will run on AC or DC current. The embodiments of the universal motor 33 disclosed herein can have a number of operating states such as, but not limited to, on, start, inrush, off, re-start, stand-by, compressing and/or other operating state. A power switch 11 can be used to change the operating state of the compressor assembly 20 at least from an "on" to an "off" state, and vice versa. In an "on" state, the compressor can be in a "compressing state" also referred to as a "pumping state", in which the compressor assembly 20 is compressing air, or a gas, or a gas mixture. In an embodiment, other operating modes, such as stand-by mode, can be engaged by a switch, or a compressor control system.

Figure 2:
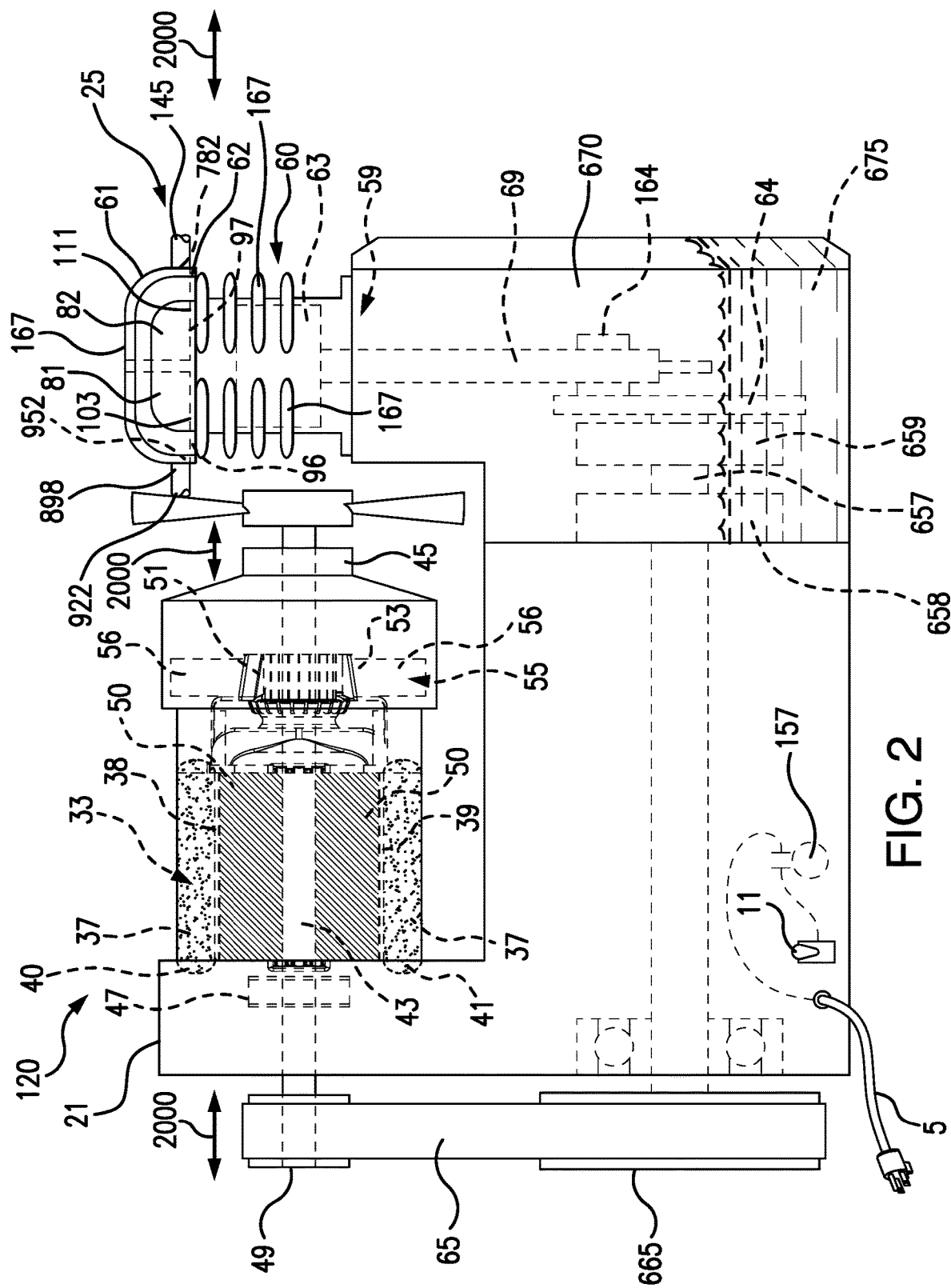
FIG. 2 shows a second embodiment of a universal motor-driven oil lubricated compressor.

In an embodiments in which the universal motor 33 is a brushed motor, a torque generated from a field in the armature of the universal motor is created through direct contact with the armature and/or a commutator 51 through a brush system 55. As shown in FIGS. 1A, 1B and 2, one or more brushes 56 in the brush system 55 can contact the commutator 51. The direct contact of the brushes 56 has fewer losses of induced field and helps to generate equivalent or higher starting torque values at a lower amperage than an induction motor.

In an embodiment, the universal motor 33 has an improved commutator 51 design using brushes 56 being formed of higher resin bonded grades, for example, at least one of an electrographite grade material, at least a doubled axial length as compared to typical universal motors, and increased tangential dimension as compared to typical universal motors, resulting in a longer brush life over typical universal motors that use brushes having lower resin bonded grades and having higher voltage drop characteristics. To achieve the longer brush life, the diameter of the commutator 51 can be increased by changing the tangential length of the brush as compared to typical universal motors. Although the number of brushes on the commutator 51 can remain the same as compared to typical universal motors, each brush can be wider and thicker than typical brushes.

In an embodiment, the pump can have at least a portion lubricated by a lubricating oil 675, such as SAE 30 non-detergent air compressor oil, or other oil. The universal motor 33 provides a higher torque at a lower amperage value than an induction motor and can overcome the viscosity of the lubricating oil 675 and can start in cold weather, under low voltage conditions, or under adverse conditions as compared to an induction motor.

The universal motor 33 can start or re-start using a starting voltage which can be 90V, or less. In an embodiment, using a 110V to 120V electrical/power supply system, the universal motor 33 can operate at a voltage in the range of 75V to 120V, or 75V to 100V, or 75V to 90V, or 108V to 120V, such as 80V, 85V, 90V or 95V. Such voltages can cause an induction motor or typical universal motor to trip the breakers of a compressor panel supplying power to the compressor. The universal motor 33 can start or re-start using a starting voltage which can be 90V, or less, and not trip the breakers of a compressor panel supplying power to the compressor assembly 20.

Herein, "start voltage" and "re-start voltage" values are measured at the motor terminal 53 and/or at a switch terminal 157 during a start or re-start action. Herein, "rated voltage", in addition to its ordinary and customary meaning, means the voltage at which the compressor is designed to operate under normal conditions. Compressors sold in the US can comply with an Underwriters Laboratories Inc., "UL", standard UL 1450. Herein, in addition to its ordinary and customary meaning, "rated voltage" means the rated voltage under UL 1450. Herein, "rated voltage" values and comparisons to "rated voltage" within this specification and its claims are under UL 1450.

In an embodiment, the compressor assembly 20 can re-start at a voltage in a range of 50% to 93%, or 62% to 90%, or 70% to 80%, of rated voltage. In a non-limiting example, the compressor assembly 20 can re-start at a voltage of 93% or less of rated voltage, such as 112V Re-start/120V Rated. In another embodiment, the compressor assembly 20 can re-start at a voltage of 62% of rated voltage, such as 75V Re-start/120V Rated.

Further, the universal motor 33 and/or compressor assembly 20 has exceptional cold temperature start and re-start characteristics, for example when the ambient temperature is 0° C., or colder. For example, the universal motor 33 and/or compressor assembly 20 can start and/or re-start at a voltage of 120V at temperatures in a range of −7° C. and greater, or at a voltage of 120V at temperatures in a range 20° C. and greater, or at a voltage of 120V at temperatures in a range −9° C. to 0° C., and greater. In an embodiment, the re-start voltage at 20° C. can be 90V or less, or 80V or less, or 70V or less. Additionally, in an embodiment, the compressor assembly 20 can start and/or re-start at a voltage of 120V at temperatures above freezing, i.e. above 32° F. In addition, the minimum re-start voltage at 20° C. for embodiments disclosed herein can be less than 90V, which prevents re-starting failures when used under low voltage conditions or in extension cord applications. In contrast, typical PSC induction motors have a minimum re-start voltage at 20° C. of greater than 110V, which can lead to the tripping of breakers.

Power can be supplied to the universal motor 33 of the compressor assembly 20 through a power cord 5 extending through the compressor assembly housing 21. In an embodiment, the universal motor 33 can start or re-start using a current of 90 amps, or less, such 70 amps, allowing an extension cord to supply power to the power cord 5. As such, even with the extension cord, the compressor assembly 20 can start or re-start without tripping the breakers on the air compressor and/or in the electrical panel through which power is supplied. The extension cord can be of any gauge, including but not limited to 12 gauge to 18 gauge The compressor assembly 20 can be designed to accommodate a variety of types of universal motor 33. In another aspect, the universal motor 33 is a high power motor providing power in a range of 1 HP to 5 HP, or greater. For example, the universal motor 33 can provide power in a range of from 1.2 HP to 10.0 HP, such as 1.3 HP, 1.5 HP, 1.7 HP, 1.9 HP, 2.5 HP, or greater.

Upon starting or re-starting the compressor assembly 20, when the universal motor 33 is changed from an "off" state to an "on" state, the universal motor 33 experiences an inrush that is, in part, characterized by a spike in current upon start-up of the universal motor 33. The universal motor 33 drives the motor shaft 43 which can cause the sprocket 49 to drive the drive belt 65 to rotate the flywheel 665. During inrush, the universal motor 33 begins to rotate, which by means of the motor shaft 43 imparts motion to the fan 200, the sprocket 49, the drive belt 65 and the pump assembly 25, which cause the pump member 59 to begin moving to compress feed air. During inrush, an "inrush voltage" occurs which is a decreased voltage during inrush as compared to nominal line voltage before inrush.

Inrush can last from a time, T1, to a time, T2. The difference in time between T1 and T2 is defined as an "inrush time". Namely, the time from when power is applied to a universal motor at rest to a time when the compressor pump member 59 reaches its normal operating speed. The inrush time can vary with compressor design characteristics. In an embodiment, the inrush time can be 600 ms or less, such as 300 ms, 250 ms, 200 ms, 100 ms, or 50 ms.

During inrush, an inrush current to the universal motor 33 increases dramatically as compared to normal running current when the pump is a normal operational speed. Herein, "inrush current" in addition to its ordinary and customary meaning means the magnetizing current and the motor starting current which occur during inrush. In an embodiment, starting current of the universal motor 33 is greater than the locked rotor current of the universal motor 33. As a result, embodiments disclosed herein can have an inrush current that can be less than 85 amps while the existing permanent split capacitors, "PSC", induction motors are typically more than 100 amps. In an embodiment, the universal motor 33 can be started or re-started with an inrush current that is 90 amps or less, such as in a range of 85 amps to 60 amps. In an embodiment, the universal motor 33 can operate in a compressing state using a current in a range of 20 amps or less, such as 8 amps to 20 amps. In an embodiment, the compressor assembly 20 can be started and/or re-started by use of a 15 A/120V/1 PH, in which 1 PH means single phase, wall outlet, by means of power cord 5 and/or by means of an extension cord connected to both the wall outlet and power cord 5.

During inrush, an "inrush torque" occurs which is an increased torque, as compared to a normal running torque when the pump is at operating speed. In an embodiment, the universal motor 33 can have a high torque value that uses a low starting current to prevent the breaker from tripping during start or re-start of the pump in cold weather, low voltage conditions, or adverse conditions. The starting torque available from the embodiments disclosed herein can be at least 40% higher at 210 in-lbs than the starting torque of the typical PSC induction motors at 150 in-lbs. In an embodiment, the inrush torque can be in a range of 160 in-lbs to 300 in-lbs, such as 175 in-lbs, or 195 in-lbs, or 210 in-lbs, or greater.

The Pump Assembly

The pump assembly 25 serves as a compression system for the compressor assembly 20. The pump assembly 25 includes a pump member 59 that is driven by the flywheel 665 that is driven by the universal motor 33.

Herein, pump assembly 25 collectively refers to the assembly of parts which achieve compression of the feed air, such as: the pump cylinder 60, a valve plate assembly 62 and a cylinder head 61 into which the feed air is fed and the compressed air is exhausted; a piston 63 within the pump cylinder 60 which can be a part of a pump member 59 and which compresses air when reciprocated by an eccentric drive 64 which is rotated by pump shaft 657, and associated components, parts and pieces.

In operation, the universal motor 33 drives the motor shaft on which a sprocket 49 is mounted and rotated. The sprocket 49 transmits rotary motion from the motor shaft 43 through a drive belt 65 to rotate a flywheel 665. Rotation of the flywheel 665 rotates a pump shaft 657, through first pump shaft bearing 658 and second pump shaft bearing 659, and an eccentric drive 64. The eccentric drive shaft rotates on an eccentric drive shaft 164. The eccentric drive shaft 164 is connected to a connecting rod 69 of the piston 63. The connecting rod 69 converts the eccentric rotation of the eccentric drive 64 into linear movement achieving the reciprocal movement of the piston 63.

The flywheel 665 and the sprocket 49 can be sized to control the speed at which the piston 63 is reciprocated thereby controlling the speed of the pump. For example, the sprocket 49 can be sized to control the piston speed within a range of from 1,500 to 3,500 strokes per minute, such as 2,300 or 3,000 strokes per minute at a motor speed of 12,500 rpm, or greater, such as 14,000 rpm.

The flywheel 665 contributes inertia to the rotating system(s) of compressor 20 and can be used to reduce the torque peaks or fluctuations associated with the typical motion of reciprocating compressors caused when the piston 63 during a reciprocating motion moves past the highest position of the piston in the cylinder before it starts to reverse and travel downward, also known as moving past top-dead-center. The inertia generated by the flywheel 665 can be determined, controlled or modified adding or increasing mass associated with or of the flywheel 665, such as increasing mass around the outer region of the flywheel. In the outer region of the flywheel, a smaller amount of increase in mass allows the flywheel 665 to generate a higher inertia than if the same mass were placed in other areas within the flywheel. An increase in mass allows the inertia generated by the flywheel 665 to dynamically compensate for the pump and universal motor 33 torque characteristics, for example, torque spikes, while allows for as little weight as possible to be added to the pump assembly 25 toward such goals. Adding a minimum amount of weight to the flywheel will assist with start up, because the mass of the flywheel works against the ability of the motor to start the compressor assembly 20. If too much mass is added to the flywheel to try to smooth out the torque spikes, then the universal motor 33 will have trouble starting or re-starting. By putting the mass at the furthest point on the flywheel from the center of rotation, the maximum inertia gain is achieved with the minimum mass, thus getting the greatest amount or reduction in torque spikes for a given amount of mass. This can also help to minimize the required starting torque to achieve a given amount of inertia. This beneficial inertia allows the compressor to generate higher air deliveries than when utilizing a system lacking such a design regarding beneficial inertia. For example, by adding a flywheel mass which generates 0.0221 lb*ft2 of additional inertia, the air flow of a compressor assembly 20 can be increased from 3.8 SCFM to 4.1 SCFM.

The belt drive system can drive the pump and the driven pump member 59 can pull air into the pump cylinder 60. The reciprocal movement of a piston 63 which can compress feed air into compressed air.

The cylinder head 61 of the pump assembly 25 can receive a feed air from a feed air path 922 through an intake feed line 898 and through a feed air inlet port 952 in the cylinder head. The feed air is compressed in the pump cylinder 60 of pump assembly 25. The cylinder head 61 can be divided to define an inlet chamber 81 that receives the feed air and an outlet chamber 82 that releases the compressed air. The compressed air is released from the outlet chamber 82 through a compressed air outlet port 782. In an embodiment, the pump cylinder 60 can provide at least a portion of the inlet chamber 81.

The valve plate assembly 62 can be disposed in the cylinder head 61 to facilitate the flow of air for compression by the piston 63. The piston 63 can force air into and out of valves of a valve plate assembly 62. The valve plate assembly 62 can have a plurality of intake ports 103 which can be closed by the intake valves 96. Ambient air, or treated air, can be drawn into the pump cylinder 60 during an intake stroke of the piston 63 through the intake ports 103. The valve plate assembly 62 can also have a plurality of exhaust ports 111 which are normally closed by the outlet valves 97. The intake valves 96 and outlet valves 97 can be one way valves.

The piston 63 can compress feed air in the pump cylinder 60 and pump the compressed air through the valve plate assembly 62 into the cylinder head 61 and then out through a compressed air outlet port 782 through an outlet line 145 and into the compressed air tank 150.

In an embodiment, the compressor assembly 20 can produce compressed air in a range of 2 SCFM to 25 SCFM, or 2.4 SCFM to 4.0 SCFM, such as 2.0 SCFM, 3.5 SCFM, or 4.0 SCFM. In an embodiment, the compressor assembly 20 can compress the feed air to a pressure in a range of from 50 psig to 500 psig, or 125 psig to 300 psig, or 75 psig to 150 psig, such as 100 psig, 150 psig, or 200 psig. A pressure regulator 320 (FIG. 4A) can allow an operator to adjust a pressure regulating valve to set a desired output pressure from the compressor assembly 20.

In an embodiment, the compressor can have a switch 11 which can be a pressure regulated on/off switch, which can automatically turn off, "cut-out", power to the universal motor 33 which can stop rotation of the universal motor 33 which also can stop the pumping of pump assembly 25. A cut-out action can be set to occur when a set cut-out pressure is obtained. Automatic "cut-in" activation of the universal motor 33 to drive the pump assembly 25 can occur at a chosen fraction of a set operating pressure, such as 25% to 99.5% of the set operating pressure. Set operating pressure can also be a value in a wide range of pressures, such as a value in a range of from about 25 psig to 500 psig, or greater, such as 75 psig, 150 psig, or 300 psig. The compressed air tank 150 can store air at a pressure in a range of at least from ambient pressure, such as 14.7 psig, to 500 psig, or greater such as 150 psig. In a non-limiting example, the universal motor 33 can be activated at a "cut-in" pressure to drive the pump assembly 25, such as when the pressure of the compressed air tank 150 falls to a set percentage of desired compressed air pressure, such as 70% of the set operating pressure, which for example can cut-in and/or activate compression at 140 psig with an operating set pressure of 200 psig, calculated by 140 psig=0.70*200 psig. In another example, the compressor assembly 20 can be set to have a cut-in pressure of 95 psig and a cut-out pressure of 125 psig. In another example, the pump can be activated when the pressure of the compressed air tank 150 falls to 80 percent of the set operating pressure, such as to cut-in and/or activate at 160 psig with an operating set pressure of 200 psig, calculated by 160 psig=0.80*200 psig.

In an embodiment, the oil lubricated compressor can start and/or re-start and drive the pump assembly 25 under a condition in which a compressed air tank 150 can contain a gas or air having a pressure in a range of 500 psig or less, or 150 psig or less, or 95 psig or less. In an embodiment, the universal motor 33 can operate at a rotation and/or motor speed between 2,500 rpm and 20,000 rpm, such as 11,252 rpm, or 7,500 rpm, 14,000 rpm. In an embodiment, the universal motor 33 can be a variable speed motor.

Cooling Air

In an embodiment, ambient air can be used as "cooling air" to cool the compressor assembly 20 and its components. As shown in FIG. 1A, the fan 200 can be coupled to the motor shaft 43 of the universal motor 33 and can circulate cooling air over the universal motor 33 and/or the cylinder head 61. In the embodiment shown in FIG. 1A, the fan 200 is connected outwardly of the pump in order to first cool the universal motor 33, followed by cooling of the cylinder head 61.

FIG. 2 illustrates a second embodiment of a universal motor-driven oil lubricated compressor assembly, compressor assembly 120. In the embodiment of compressor assembly 120, the fan 200 is positioned between the universal motor 33 and the cylinder head 61 of the pump assembly 25 to cool both the universal motor 33 and the cylinder head 61. The direction of the cooling air stream 2000 can be determined by the direction of rotation of the fan 200. The direction of the cooling air stream 2000 can be either in a direction from the universal motor 33 to the cylinder head 61, or in an opposite direction from the cylinder head 61 to the universal motor 33. The cylinder head 61 can have fins 167 formed thereon to facilitate heat dissipation from the pump 59.

In an embodiment, the cooling air stream 2000 can have a volumetric flow rate of 50 SCFM to 100 SCFM; and/or heat transfer rates of 60 BTU/min to 200 BTU/min The compressor assembly 20 using the universal motor 33 described herein can achieve a long operating life. In an non-limiting example, the operating life of the universal motor 33 can be in a range of 200 hrs to 3000 hrs, or such as 400 hrs, 600 hrs, 1000 hrs, or greater.

Figure 3:
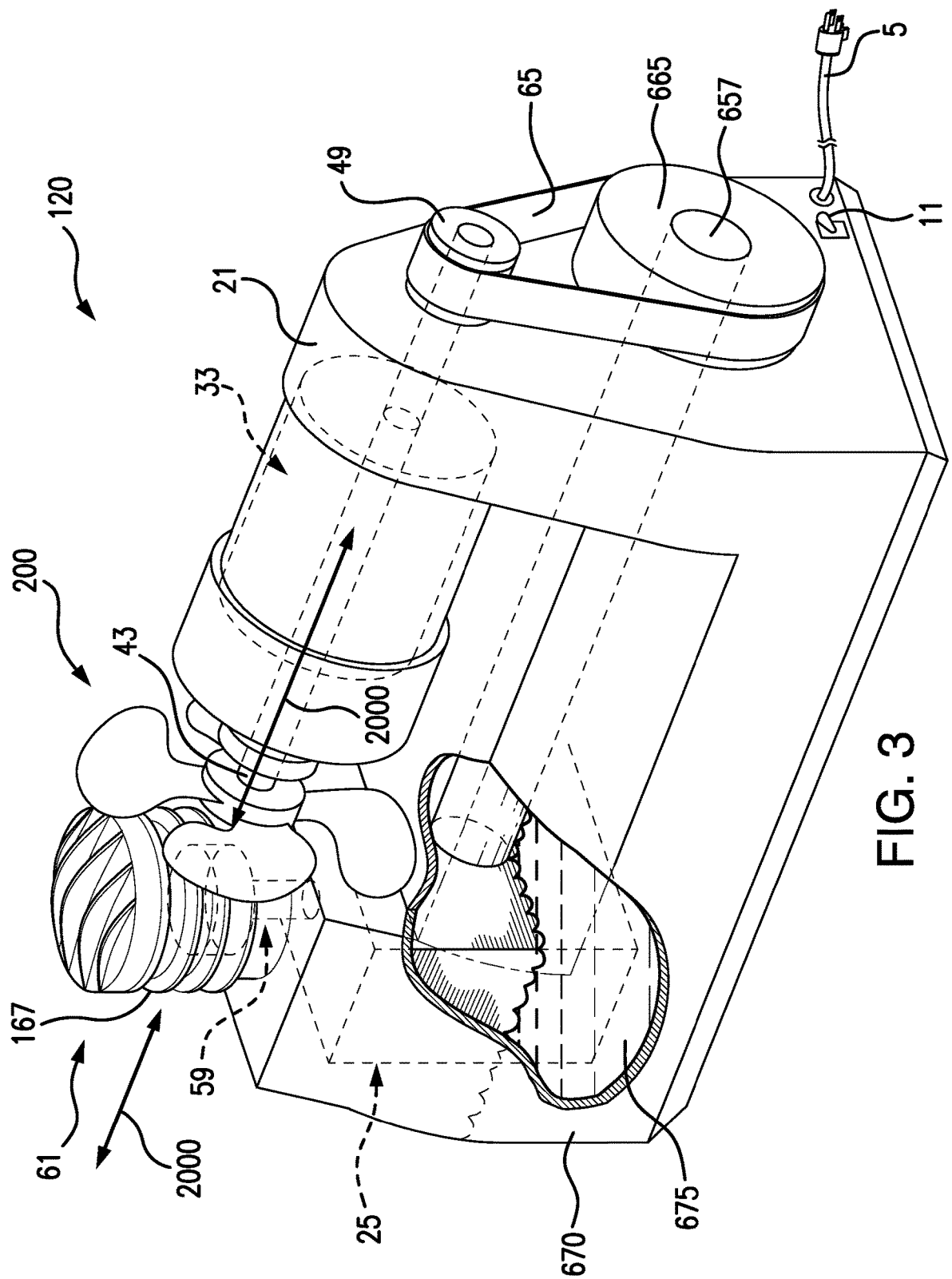
FIG. 3 shows a perspective view of the embodiment of the oil lubricated compressor shown in FIG. 2.

FIG. 3 shows a perspective view of the compressor assembly 20 shown in FIG. 2. The pump assembly 25 is shown being lubricated at least in part by the lubricating oil 675 and pump member 59. As shown in FIG. 3, the universal motor 33 includes the motor shaft 43 for rotating both the fan 200 and the sprocket 49. The sprocket 49 transmitting rotary motion driving the flywheel 665 through the drive belt 65 for driving the pump assembly 25. The fins 167 of the cylinder head 61 are cooled by the fan 200 disposed between the cylinder head and the universal motor 33 shown within the compressor assembly housing 21.

Figure 4A:
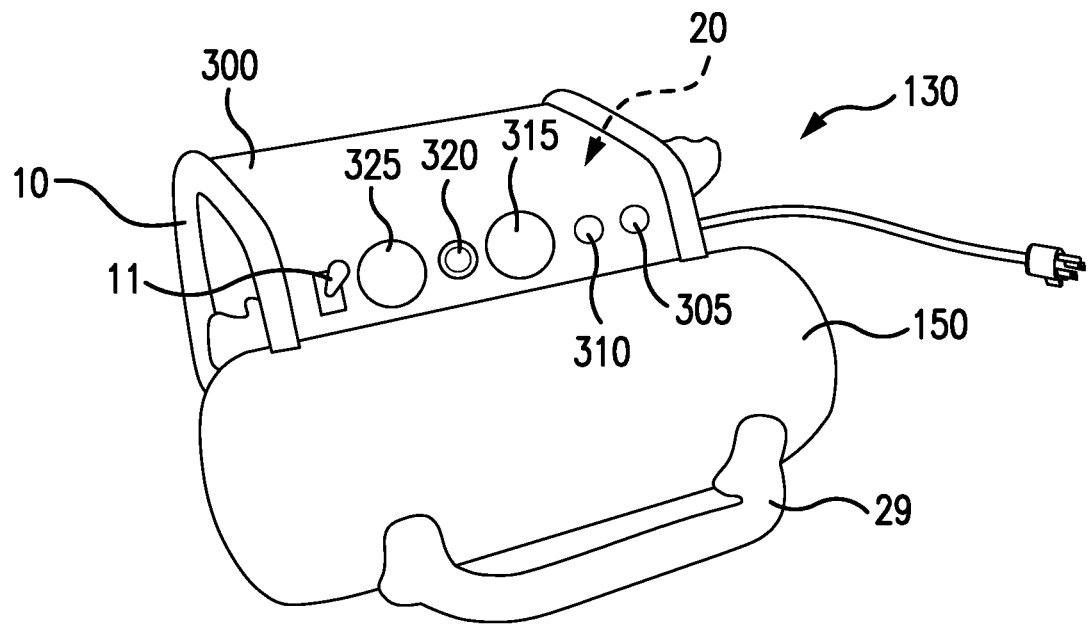
FIG. 4A shows a perspective view of an air compressor having an oil lubricated pump having a dashboard.

FIG. 4A shows a perspective view of an embodiment of an air compressor 130 having a compressor assembly 20, or compressor assembly 120, that can provide compressed air to the compressed air tank 150. The air compressor 130 which can have a dashboard 300 that has sockets and/or fittings for connections, gauges and valves. A first quick connect fitting 305, a second quick connect fitting 310, a regulated pressure gauge 315, a pressure regulator 320 and a tank pressure gauge 325 are shown. In an embodiment, an outlet line, hose or other device for receiving compressed air can be connected to the first quick connect fitting 305 and/or the second quick connect fitting 310. In an embodiment, the air compressor assembly 130 can have a handle 29 for portability and can be mounted on a portion of frame 10.

Figure 4B:
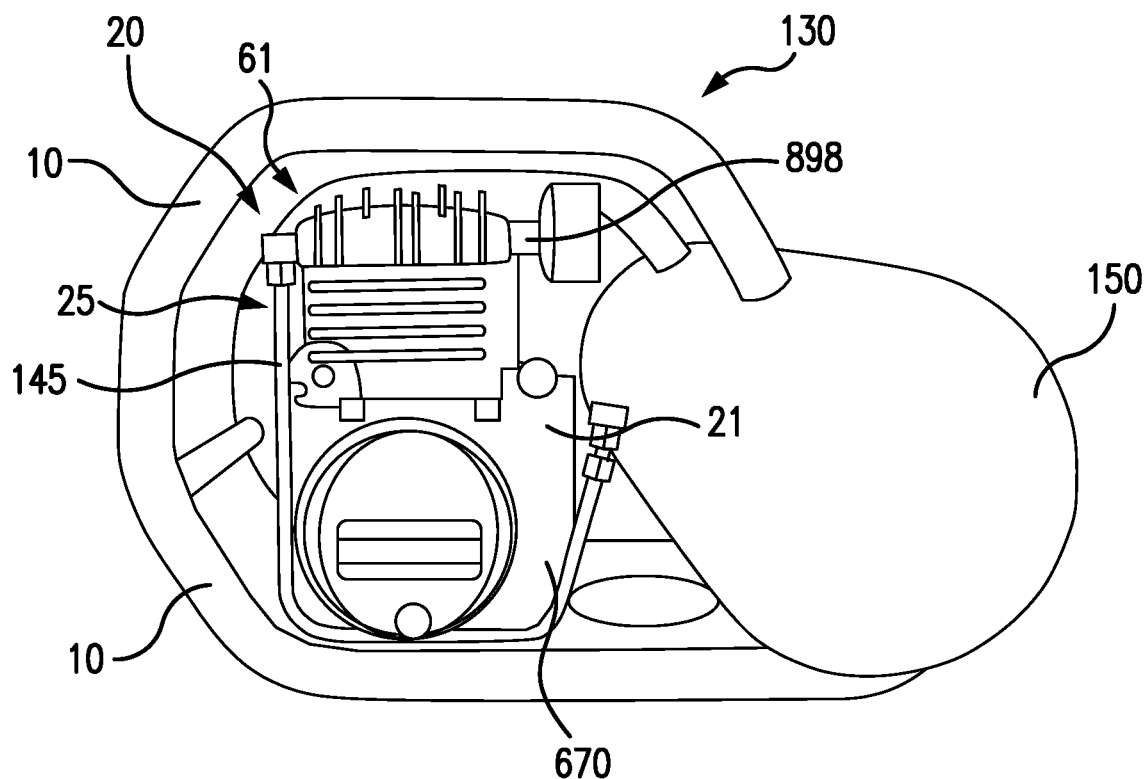
FIG. 4B shows a side view of the air compressor of FIG. 4A.

FIG. 4B is a side view of the air compressor 130 of FIG. 4A. FIG. 4B shows the pump assembly 25, as well as the compressed air outlet line 145 feeding compressed air from the cylinder head 61 to the compressed air tank 150.

The scope of this disclosure is to be broadly construed. It is intended that this disclosure disclose equivalents, means, systems and methods to achieve the devices, designs, operations, control systems, controls, activities, mechanical actions, fluid dynamics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. Additionally, this disclosure regards a compressor and its many aspects, features and elements. Such an apparatus can be dynamic in its use and operation. This disclosure is intended to encompass the equivalents, means, systems and methods of the use of the compressor assembly 20 and its many aspects consistent with the description and spirit of the apparatus, means, methods, functions and operations disclosed herein. The claims of this application are likewise to be broadly construed.

It will be appreciated that the above description is merely exemplary in nature and is not intended to limit the present disclosure, its application or uses. While specific examples have been described in the specification and illustrated in the drawings, it will be understood by those of ordinary skill in the art that various changes can be made and equivalents can be substituted for elements thereof without departing from the scope of the present disclosure and claims. Furthermore, the mixing and matching of features, elements and/or functions between various examples is expressly contemplated herein, even if not specifically shown or described, so that one of ordinary skill in the art would appreciate from this disclosure that features, elements and/or functions of one example can be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description.

We claim:

1. A method for starting an oil lubricated compressor, comprising the steps of:
   providing a universal motor;
   configuring the universal motor to drive a flywheel and a drive belt that drives a pump assembly which is at least in part lubricated by an oil;
   applying a start voltage to the universal motor in a range of 75V to 90V;

applying an inrush current of 90 amps or less to the universal motor for an inrush time of 300 ms or less; and achieving a rotation of a rotor of the universal motor.

2. The method for starting an oil lubricated compressor according to claim 1, wherein the universal motor is a brushed universal motor.

3. The method for starting an oil lubricated compressor according to claim 1, wherein the universal motor is a brushed universal motor having an electrographite grade brush.

4. The method for starting an oil lubricated compressor according to claim 1, wherein the universal motor has an operating life of 300 hrs or greater.

5. The method for starting an oil lubricated compressor according to claim 1, further comprising the step of:
applying an inrush voltage of 75V or less to the universal motor.

6. The method for starting an oil lubricated compressor according to claim 1, wherein the inrush current is 85 amps or less.

7. The method for starting an oil lubricated compressor according to claim 1, further comprising the step of:
re-starting the universal motor at a voltage of 90% or less of rated voltage.

8. The method for starting an oil lubricated compressor according to claim 1, further comprising the step of:
re-starting the universal motor at a voltage in a range of 75V to 90V.

9. The method for starting an oil lubricated compressor according to claim 1, further comprising the step of:
starting the universal motor at an ambient temperature in a range of −9° C. to 20° C.

10. The method for starting an oil lubricated compressor according to claim 1, further comprising the step of:
re-starting the universal motor at an ambient temperature in a range of −9° C. to 20° C.

11. The method for starting an oil, lubricated compressor according to claim 1, further comprising the step of:
lubricating at least a portion of the pump assembly by an oil.

12. The method for starting an oil lubricated compressor according to claim 1, further comprising the step of:
providing a fan forcing a flow of, a cooling air stream to cool to both the universal motor and a cylinder head of the pump assembly.

13. The method for starting an oil lubricated compressor according to claim 1, further comprising the step of:
providing a fan generating a cooling air stream that flows across at least a portion of a cylinder head of the pump assembly and across at least a portion of the universal motor.

14. The method for starting an oil lubricated compressor according to claim 1, further comprising the step of:
providing a fan disposed between the universal motor and a cylinder head of the pump assembly.

15. The method for starting an oil lubricated compressor according to claim 1, further comprising the step of:
providing a fan disposed between the universal motor and a cylinder head of the pump assembly; and
generating a cooling air stream by said fan that flows across at least a portion of the cylinder head prior to flowing across at least a portion of the universal motor.

16. The method for starting an oil lubricated compressor according to claim 1, further comprising the step of:
providing a fan disposed between the universal motor and a cylinder head of the pump assembly, and
generating a cooling air stream by said fan that flows across at least a portion of the universal motor prior to flowing across at least a portion of the cylinder head.

17. The method for starting an oil lubricated compressor according to claim 1, further comprising the step of:
providing a fan,
wherein the universal motor is configured between the fan and a cylinder head of the pump assembly.

18. The method for starting an oil lubricated compressor according to claim 1, further comprising the step of:
providing a fan generating a cooling air stream,
wherein the universal motor is configured between the fan and a cylinder head of the pump assembly; and
wherein the cooling air stream flows across at least a portion of a cylinder head of the pump assembly prior to flowing across at least a portion of the universal motor.

19. The method for starting an oil lubricated compressor according to claim 1, further comprising the step of:
providing a fan generating a cooling air stream,
wherein the universal motor is configured between the fan and a cylinder head of the pump assembly; and
wherein the cooling air stream flows across at least a portion of the universal motor prior to flowing across at least a portion of a cylinder head of the pump assembly.

* * * * *